US009257015B2

(12) United States Patent
Cornett

(10) Patent No.: US 9,257,015 B2
(45) Date of Patent: Feb. 9, 2016

(54) SYSTEMS AND METHODS FOR ADVANCED WAGERING

(71) Applicant: Pari-Mutual Solutions, LLC, Naples, FL (US)

(72) Inventor: Mark A. Cornett, Naples, FL (US)

(73) Assignee: Pari-Mutual Solutions, LLC, Wilmington, DE (US)

( * ) Notice: Subject to any disclaimer, the term of this patent is extended or adjusted under 35 U.S.C. 154(b) by 0 days.

(21) Appl. No.: 13/856,901

(22) Filed: Apr. 4, 2013

(65) Prior Publication Data

US 2014/0302904 A1 Oct. 9, 2014

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ........ *G07F 17/3288* (2013.01); *G07F 17/3244* (2013.01)

(58) Field of Classification Search
USPC ................. 463/16, 25, 40, 20, 22, 39; 700/93
See application file for complete search history.

(56) References Cited

U.S. PATENT DOCUMENTS

| | | | | |
|---|---|---|---|---|
| 6,004,211 | A * | 12/1999 | Brenner et al. | 463/40 |
| 7,435,176 | B2 | 10/2008 | McNutt et al. | |
| 8,092,301 | B2 | 1/2012 | Alderucci et al. | |
| 8,292,729 | B2 | 10/2012 | Vlazny et al. | |
| 8,337,294 | B2 | 12/2012 | Sharkov et al. | |
| 2001/0051540 | A1 * | 12/2001 | Hindman et al. | 463/25 |
| 2005/0003878 | A1 * | 1/2005 | Updike | 463/16 |
| 2011/0055223 | A1 | 3/2011 | Elmore et al. | |
| 2012/0322540 | A1 * | 12/2012 | Shechtman | 463/25 |
| 2013/0030556 | A1 * | 1/2013 | Wolfe et al. | 700/93 |

FOREIGN PATENT DOCUMENTS

EP 1319428 A3 6/2003

OTHER PUBLICATIONS

U.S. Appl. No. 60/004,211, filed Dec. 21, 1999, Brenner et al.
PCT International Search Report and Written Opinion, dated Apr. 11, 2013, 9 pages.

* cited by examiner

*Primary Examiner* — Adetokunbo O Torimiro
(74) *Attorney, Agent, or Firm* — Dinsmore & Shohl LLP

(57) ABSTRACT

Included are systems and methods for advanced wagering. Some embodiments may include determining a desired wagering event for placing a wager, providing a user interface that includes a wager field for a user to indicate a wager and a payout field for the user to enter a desired payout that is based on the wager, calculating a wager amount to achieve the desired payout, and providing the wager amount to the user.

20 Claims, 11 Drawing Sheets

WAGER TABLE

| COLUMN FIRST ROW SECOND | 1 | 2 | 3 | 4 | 5 | 6 |
|---|---|---|---|---|---|---|
| 1 | | 96 | | 312 | 104 | 1390 |
| 2 | 160 | | | 130 | 48 | 418 |
| 3 | | | | | | |
| 4 | 308 | 100 | | | 102 | 878 |
| 5 | 144 | 42 | | 130 | | 328 |
| 6 | 864 | 166 | | 472 | 154 | |

| COLUMNS FIRST ROWS SECOND | 1 | 2 | 3 | 4 | 5 | 6 |
|---|---|---|---|---|---|---|
| 1 | | 109.40 | SCR | 31.40 | 106.00 | 7.40 |
| 2 | 62.80 | | SCR | 80.20 | 229.40 | 23.40 |
| 3 | SCR | SCR | | SCR | SCR | SCR |
| 4 | 32.40 | 107.20 | SCR | | 97.80 | 11.40 |
| 5 | 73.20 | 246.40 | SCR | 76.40 | | 30.80 |
| 6 | 11.80 | 60.00 | SCR | 20.80 | 66.60 | |

SYSTEMS AND METHODS FOR ADVANCED WAGERING

BACKGROUND

1. Field

Embodiments provided herein generally relate to systems and methods for advanced wagering, and particularly to a wagering platform for providing betting strategy to accomplish desired winnings.

2. Technical Background

As wagering on different events has become more accepted, new avenues for placing wagers have become available. As an example, many online wagering companies (advance deposit wagering providers) now provide options for receiving an advance payment that the online player utilizes to place online wagers. If the player loses a wager, the wagered amount is removed from the advance payment. If the player wins a wager, the winnings are deposited into the advance account. The player may withdraw funds from the advance account at his/her discretion.

While these online wagering websites have provided players with a convenient mechanism for wagering on events, the structure for placing those wagers is often difficult for a player to navigate. As an example, if a player wishes to place an Exacta bet, he/she has to manually calculate how much the wager will cost and may have no idea of the expected payout, even when provided with the odds of a given combination.

SUMMARY

Included are systems and methods for advanced wagering. Some embodiments may include determining a desired wagering event for placing a wager, providing a user interface that includes a wager field for a user to indicate a wager and a payout field for the user to enter a desired payout that is based on the wager, calculating a wager amount to achieve the desired payout, and providing the wager amount to the user.

Some embodiments of a non-transitory computer-readable medium include logic that causes a computing device to determine a desired event participant of an event for wagering, determine first odds for a wager of the desired participant, based on a signal participant wager pool, and calculate second odds of the wager of the desired participant alone, based on a multiple participant wager pool. In some embodiments, the logic causes the computing device to compare the first odds to the second odds to determine which pool provides better odds for the player and provides data related to the comparison to a user.

Some embodiments of a method may be configured to determine a plurality of desired event participants for wagering, to receive player odds for each of the plurality of desired event participants, and to determine track odds for each of the plurality of desired event participants. Additionally, some embodiments of the method are configured to receive a proposed wager that includes at least two of the plurality of desired event participants, to calculate a track payout for the proposed wager based on the track odds, and to calculate a hypothetical payout for the proposed wager, based on the player odds. Still some embodiments of a method are configured to compare the hypothetical payout with the track payout to determine overlay data that indicates whether the proposed wager is a net gain for the player and provide the overlay data for display.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Accordingly, embodiments disclosed herein are configured to provide a platform for calculating payouts, odds, and other information prior to a player placing a wager. If a player wishes to place a wager, embodiments are configured to provide data related to the amount of money that will be won on a given combination. Embodiments may also provide a user interface that provides a user field to enter an amount of money that the player wishes to win on the wager. The platform may then indicate the amount of money that the user will need to wager on a particular combination in order to win the entered amount.

As an example, if the player is wagering on horse racing, the player may decide to place an Exacta bet on a particular race. Based on the odds and finish positions of each of the horses, the payout will change. Accordingly, the user may enter the horses that will be part of the Exacta, as well as the amount of money that the player wishes to win on the wager. The system will then provide one or more wagering scenarios that include an amount needed to bet on each portion of the wager to win the desired win amount.

Additionally, embodiments disclosed herein are configured to provide track odds, receive player odds, and compare the player odds to the track odds to determine an improved wagering strategy for the player. Referring again to the horseracing example, a race may include five (5) horses. The track odds are determined based on the wagers that have been placed in the parimutuel pool. Additionally, the player may have handicapped the race and may have determined his/her own odds for each of the horses. Accordingly, the player may enter his/her perceived odds into the platform. Embodiments disclosed herein may then compare the track odds with the player odds to determine overlay data, such as an odds overlay. Embodiments may then recommend bets based on the overlay and/or provide other information to assist the player in placing wagers.

Figure 1:
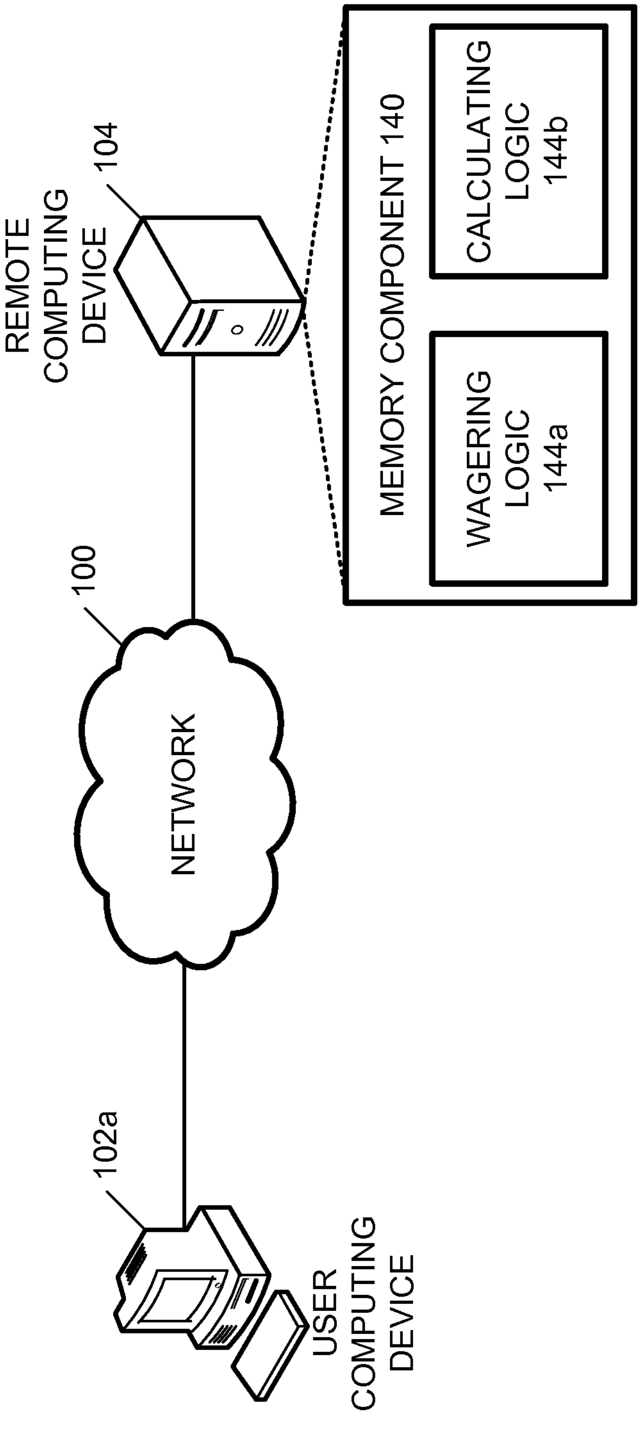
FIG. 1 depicts a computing environment for providing an advanced wagering platform, according to one or more embodiments shown and described herein.

Referring now to the drawings, FIG. 1 depicts a computing environment for providing an advanced wagering platform, according to one or more embodiments shown and described herein. As illustrated, a network 100 may be coupled to a user computing device 102 and a remote computing device 104. The network 100 may include any wide area and/or local area network, such as the internet, a mobile communications network, a satellite network, a public service telephone network (PSTN) and/or other network for facilitating communication between devices. If the network 100 includes a local area network, the local area network may be configured as a corporate network, racetrack network, and/or other open or closed network that is coupled to a wide area network.

Accordingly, the user computing device 102 may include a personal computer, laptop computer, tablet, mobile computing device, mobile communications device, database, off-track computer, on-track computer, and/or other computing device that is accessible by a user. The remote computing device 104 may be configured as a server, personal computer, or other similar device for providing the functionality described herein. The remote computing device 104 includes a memory component 140, which stores wagering logic 144*a* and calculating logic 144*b*. The wagering logic 144*a* may be configured to provide a user option, such as wagering options, as described in more detail below. The calculating logic 144*b* may cause the remote computing device 104 to calculate data related to a wagering event, such as a race, as also described below.

It should be understood that while the user computing device 102 is depicted as a single personal computer and the remote computing device 104 is depicted as a single server, these are merely examples. Specifically, the user computing device 102 may include one or more personal computers, servers, laptops, tablets, mobile computing devices, data storage devices, etc. that are configured for providing information to a user. Similarly, the remote computing device 104 may include one or more servers, personal computers, laptops, tablets, mobile computing devices, data storage devices, etc. for providing the options and data discussed herein.

Figure 2:
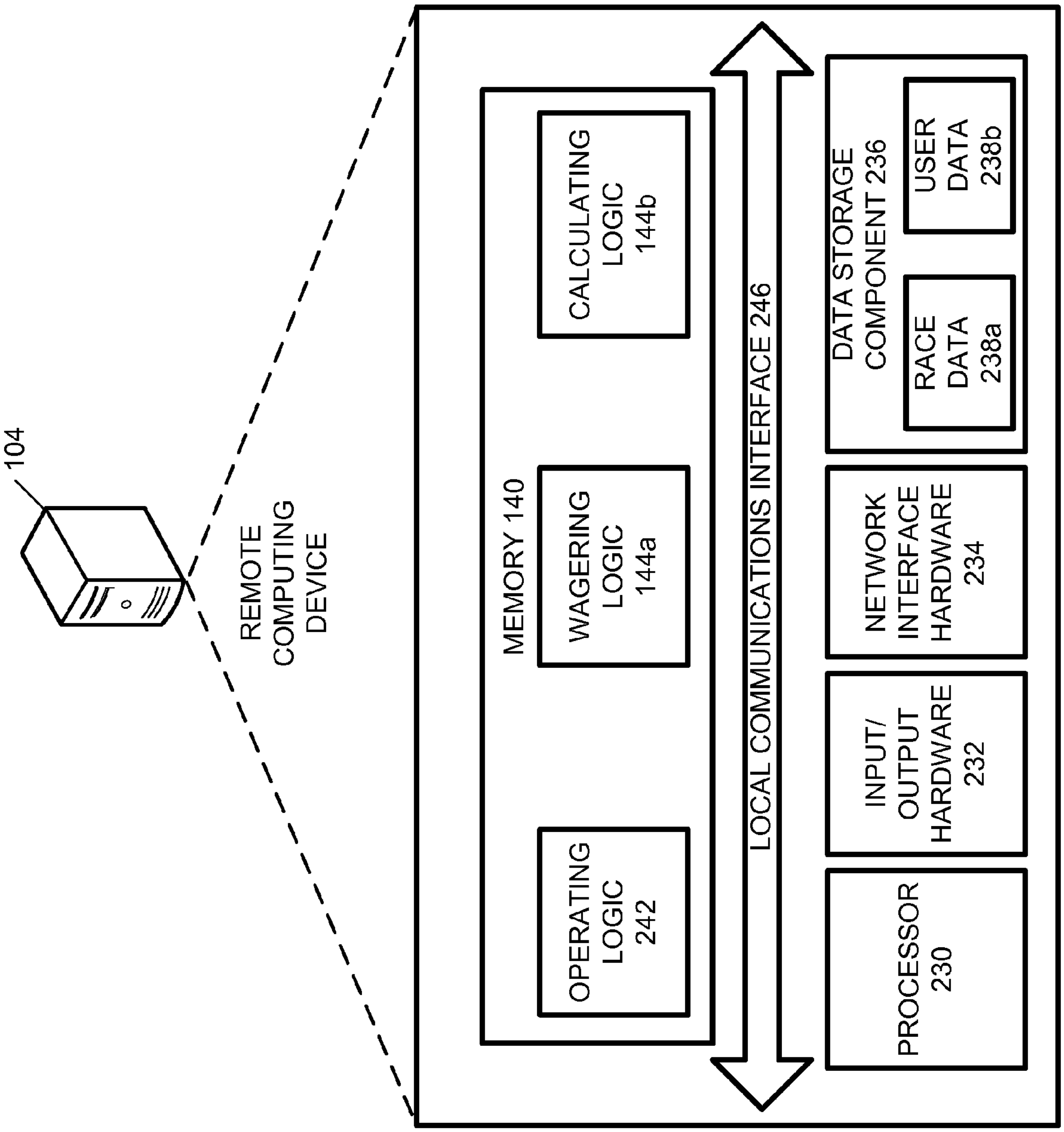
FIG. 2 depicts a remote computing device for providing an advanced wagering platform, according to one or more embodiments shown and described herein.

FIG. 2 depicts a remote computing device 104 for providing an advanced wagering platform, according to one or more embodiments shown and described herein. In the illustrated embodiment, the remote computing device 104 includes a processor 230, input/output hardware 232, network interface hardware 234, a data storage component 236 (which stores video data 238*a* and state data 238*b*), and the memory component 140. The memory component 140 includes hardware and may be configured as volatile and/or nonvolatile memory and, as such, may include random access memory (including SRAM, DRAM, and/or other types of RAM), flash memory, registers, compact discs (CD), digital versatile discs (DVD), and/or other types of non-transitory computer-readable mediums. Depending on the particular embodiment, the non-transitory computer-readable medium may reside within the remote computing device 104 and/or external to the remote computing device 104.

Additionally, the memory component 140 may be configured to store operating logic 242, the wagering logic 144*a*, and the calculating logic 144*b*, each of which may be embodied as a computer program, firmware, and/or hardware, as an example. A local communications interface 246 is also included in FIG. 2 and may be implemented as a bus or other interface to facilitate communication among the components of the remote computing device 104.

The processor 230 may include any hardware processing component operable to receive and execute instructions (such as from the data storage component 236 and/or memory component 140). The input/output hardware 232 may include and/or be configured to interface with a monitor, keyboard, mouse, printer, camera, microphone, speaker, and/or other device for receiving, sending, and/or presenting data. The network interface hardware 234 may include and/or be configured for communicating with any wired or wireless networking hardware, a satellite, an antenna, a modem, LAN port, wireless fidelity (Wi-Fi) card, WiMax card, mobile communications hardware, and/or other hardware for communicating with other networks and/or devices. From this connection, communication may be facilitated between the remote computing device 104 and other computing devices.

Similarly, it should be understood that the data storage component 236 may reside local to and/or remote from the remote computing device 104 and may be configured to store one or more pieces of data for access by the remote computing device 104 and/or other components. In some embodiments, the data storage component 236 may be located remotely from the remote computing device 104 and thus accessible via the network 100. In some embodiments however, the data storage component 236 may merely be a peripheral device, but external to the remote computing device 104.

Included in the memory component 140 are the operating logic 242, the wagering logic 144*a*, and the calculating logic 144*b*. The operating logic 242 may include an operating system and/or other software for managing components of the remote computing device 104. Similarly, the wagering logic 144*a* may be configured to cause the remote computing device 104 to receive and process wagers of various wagering events. The calculating logic 144*b* may cause the remote computing device 104 to make various calculations associated with the wagering events and provide user interfaces described herein.

It should be understood that the components illustrated in FIG. 2 are merely exemplary and are not intended to limit the scope of this disclosure. While the components in FIG. 2 are illustrated as residing within the remote computing device 104, this is merely an example. In some embodiments, one or more of the components may reside external to the remote computing device 104.

Figure 3:
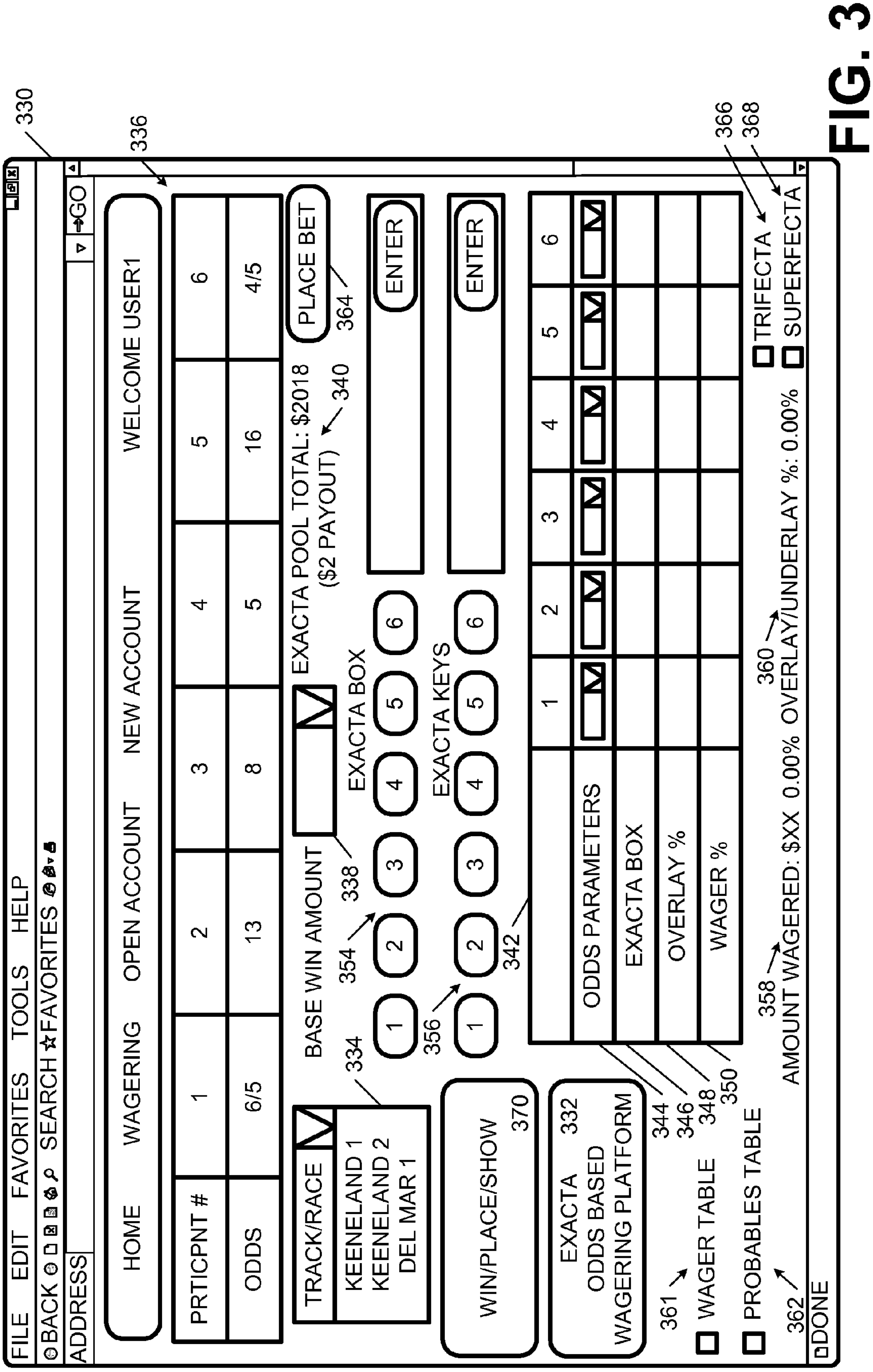
FIG. 3 depicts a user interface for providing multi-participant wagering using the advance platform, according to one or more embodiments shown and described herein.

FIG. 3 depicts a user interface 330 for providing multi-participant wagering using the advance platform, according to one or more embodiments shown and described herein. Specifically, the remote computing device 104 may be configured as a web server or other device for providing an online wagering platform. After a user accesses the portal and authenticates, the user may be provided with access to his/her account and may thus be able to place a wager on a wagering event, such as a horse race. As illustrated, the user may be provided with the user interface 330 as a default home page and/or in response to selection of an Exacta option 332. The user may also be provided with a track/race option 334 for selecting the desired wagering event. Upon selecting the desired wagering event, an odds chart 336 may be provided, which includes each of the participants (in this example horses) of the desired wagering event (in this example, a horse race), as well as the odds that have been calculated for each participant winning the wagering event.

The odds may be calculated from a parimutuel wagering pool, based on the wagers that have been placed for each of the participants. Specifically, odds are calculated by dividing amounts wagered on a particular participant against the total amount in the wagering pool. Thus, the "favorite" will have the lowest odds because the most money has been wagered for that participant, relative to the other participants in the event. Accordingly, unlike other wagering events such as football wagering, in horse racing, odds (and odds other similar events) can change and all players are subject to the final odds, regardless of the odds at the time the wager was placed.

Also included in the user interface 330 is a base win amount option 338. Specifically, in many current wagering systems, a player must specify the type of wager, the selected participant(s), and the amount of the entire wager. Consequently, the player would have no idea whether the amount that could be won from the wager justifies the amount being wagered. Accordingly, embodiments disclosed herein are configured for the player and/or user to specify an amount that the player wishes to win on the wager. With this information and the desired participants selected, embodiments calculate a wagering amount. While the base win amount option 338 is depicted as a dropdown menu with a finite number of options, some embodiments may be configured for the player to specify any amount. The user interface 330 also provides a pool total data 340, which provides the total of the parimutuel pool for this particular wagering event. The information in the pool total data 340 may be utilized for the remote computing device 104 to calculate betting amounts for the player to achieve the base win amount specified in the base win amount option 338.

The user interface 330 also includes a player odds section 342 that includes odds parameter portion 344, an Exacta box portion 346, an overlay percent portion 348, and a wager percent portion 350. Specifically, the player may handicap the event prior to accessing the user interface 330 and may assign player odds to each participant according to the player's analysis. Accordingly, this information may be input into the odds parameter portion 344 for each of the participants. As will be understood, the odds designated by the player will most likely differ for the odds provided in the odds chart 336.

The user interface 330 also includes an Exacta box section 354 and an Exacta keys section 356 for providing a key wager. After the user inputs the player odds in the player odds section 342, the user may designate which event participants will become part of the wager. If the player is placing an Exacta box wager (where the bet includes all permutations of the selected participants for finishing first and second in the wagering event), user may select the icons of the participants that the player wishes to include in the wager. Similarly, if the player is making an Exacta keys bet (where the player selects one or more "keyed" participant paired with all other event participants), the user selects the icons or otherwise enters the desired participants associated with that wager. Upon selecting the desired wager, the user may select the respective enter option. In response, the user interface 330 may provide data in the player odds section 342, as well as amount wagered section 358, and an overlay/underlay percentage 360 for determining a total overlay percentage that represents whether the selected wager is a prudent wager, as will be described with more detail in FIG. 4.

It should be understood that, based on the selected participants, the system may be configured to calculate the amount of each wager to achieve the base win amount. As an example in horseracing, if the user selects an Exacta key wager with the 1-horse, such that the 1-horse is keyed with all other participants in the race, the embodiments will calculate the amount to wager for each of the separate portions of the wager (e.g., the 1-2 wager, the 1-3 wager, the 1-4 wager, etc.), based on the odds of each wager. By selecting the place bet option 364, those wagers at those amounts may be placed.

Also included are a wager table option 361 and a probables table option 362 for providing additional data related to the wagers that have already been placed for the wagering event, as described with reference to FIGS. 5 and 6. The place bet option 364 is provided for actually placing the wager on the event A Trifecta option 366 and a Superfecta option 368 are also provided for allowing the user to view data and place Trifecta and Superfecta wagers on the wagering event. Specifically, a Trifecta wager is similar to an Exacta wager, except that instead of determining the winning participant and the second place participant, a Trifecta wager selects the participants that will finish first (win), second (place), and third (show). Similarly, a Superfecta wager selects, the winning participant, the placing participant, the showing participant, and the fourth place participant. Accordingly, the user may select the desired participants for the selected type of wager. Upon selecting the respective enter option, the player odds section 342 will be populated. Additionally, a win/place/show option 370 is included for providing options related to a win wager, a place wager, and a show wager, as described with reference to FIG. 7, below.

It should be understood that this while description utilizes the terminology "player" and "user" throughout, these are merely examples. Specifically, in many embodiments, the player is the bettor and the user is a different person who operates the user computing device 102 and/or places the wagers for the player. In some embodiments however, the user and the player are actually the same person, such as in many online wagering scenarios. Additionally, while many examples of horseracing are provided here, it should be understood that any type of racing and/or similar parimutuel wagering should be considered within the scope of this disclosure.

Figure 4:
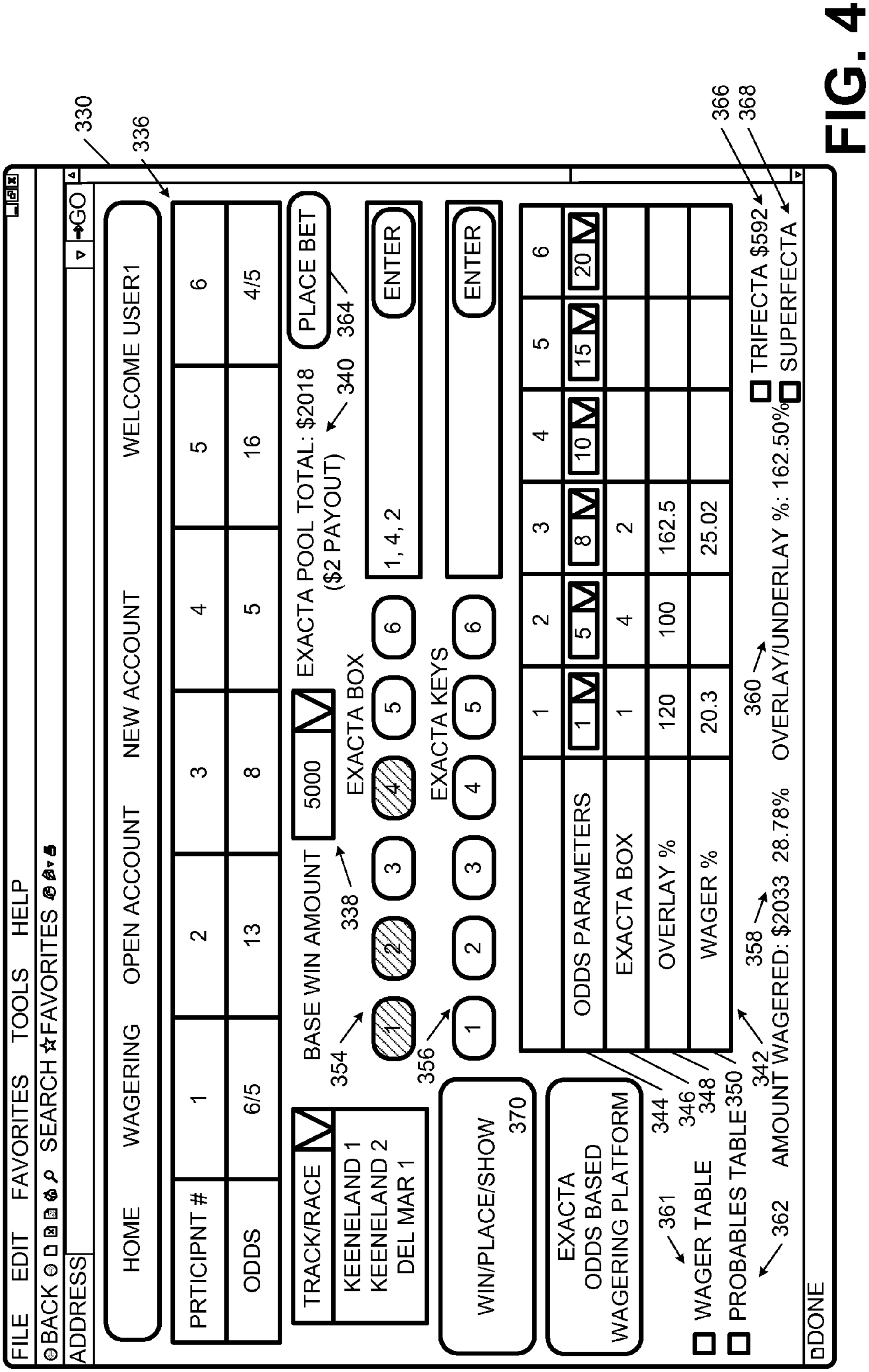
FIG. 4 depicts a user interface for providing the multi-participant wagering using the advance platform, further illustrating example input data that may be included, according to one or more embodiments shown and described herein.

FIG. 4 depicts a user interface 330 for providing the multi-participant wagering using the advance platform, further illustrating example input data that may be included, according to one or more embodiments shown and described herein. In response to specifying player odds in the odds parameter portion 344 and selection of the icons in the Exacta box specifying that the player wishes to study an Exacta box wager, the user interface 330 of FIG. 4 may be provided. As illustrated, the user has designated that the base win amount is $5000 in the base win amount option 338 and the player's designated odds for all participants (or at least a portion of the participants) in the odds parameter portion 344. Additionally, the player specified that the desired wager is an Exacta box with the first participant or the "1-horse," the second participant or the "4-horse," and the fourth participant or the "2-horse."

As will be understood, because the player specified an Exacta box, the order of finish of the selected participants is irrelevant, so long as two of the selected participants finish first and second. Consequently, the player will win the wager if the participants finish in any of the following orders for first and second: 1-4, 1-2, 4-1, 4-2, 2-1, or 2-4. As such, the player is actually placing 6 wagers to accommodate these permutations. As will also be understood, while the player in FIG. 4 specified three participants in the Exacta box wager, this is merely an example. Any number of participants greater than two may be included in an Exacta box wager (limited by the number of participants in the race).

In response to selection of the respective enter option, the remote computing device 104 populates the player odds section 342 with data. Specifically, the player designated that the 1-horse should be favored at 1/1 odds. The 4-horse should be set at 5/1 odds, and the 2-horse should be set at 8/1 odds. Upon receiving this information, the remote computing device 104 calculates the difference between the player assigned odds and the track odds provided in odds chart 336. The track odds provided in the odds chart 336 are periodically updated, based on the wagers that are made. From this information, the remote computing device 104 determines the overlay percentage, which represents the amount of difference between the player's odds for a participant and the track odds.

Specifically, the player assigned to the 1-horse odds of 1/1, while the track odds for the 1-horse are 6/5. Consequently, according to the player's assessment of the race, the overlay percentage would be greater than 100% (120% in this case). This means that placing a wager with the 1-horse is a net gain because payout is greater than the player's odds would indicate. Specifically, if the player wagered $100 on a participant a 1/1 odds to win, the player would win his/her wager back, plus the value of the bet in winnings (e.g., $200 winnings, $100 of which is profit). However, if the player makes the same $100 wager on a participant with 6/5 odds, the player would win $120 profit or 20% more. So for this wager, the player would make more than the player's odds would dictate.

Similarly, the player's odds and the track odds are the same for 4-horse, so the overlay percentage of the 4-horse is 100%. This means that wagering on the 4-horse is a neutral wager because the payout matches the player's odds. The 2-horse has player's odds of 8/1, but track odds of 13/1, thus the overlay percentage would be 162.5%. Again, this would be a net gain because the payout would be high, when compared to the player's odds.

As is evident, the overlay percentage is a tool that may be used to provide the amount of disparity between the player's odds and the track odds, thus indicating the value of such a wager. Specially, the values provided in the overlay percent portion 348 may be calculated by dividing the track odds by the player's odds. With that said, other processes may be used to indicate this amount of disparity.

Also provided in the player odds section 342 are the overlay percent portion 348 and the wager percent portion 350. The overlay percent portion 348 is related to an individual overlay percentage of each individual participant as a measure between track odds and player odds. Similarly, the wager percent portion 350 represents the percentage of the amount wagered for that portion of the wager to win the base win amount as designated in the base win amount option 338.

In response to receiving the user input described above, the remote computing device 104 may additionally indicate, in amount wagered section 358, an amount that will need to be wagered on the selected participants to win at least the base win amount (assuming that the wager is won). Additionally, the percentage depicted in the amount wagered section 358 represents an average cost of each wager. Also included is the overall overlay/underlay percentage 360, which provides a comparison of the combined track odds for the bet with the combined player's odds. Additionally, the Trifecta option 366 and Superfecta option 368 are also provided and may be accompanied with the amount wagered data to achieve the base win amount if a Trifecta or Superfecta is wagered instead of an Exacta. In the example of FIG. 4, because only three participants are designated, the Superfecta amount wagered is not provided.

Figure 5:
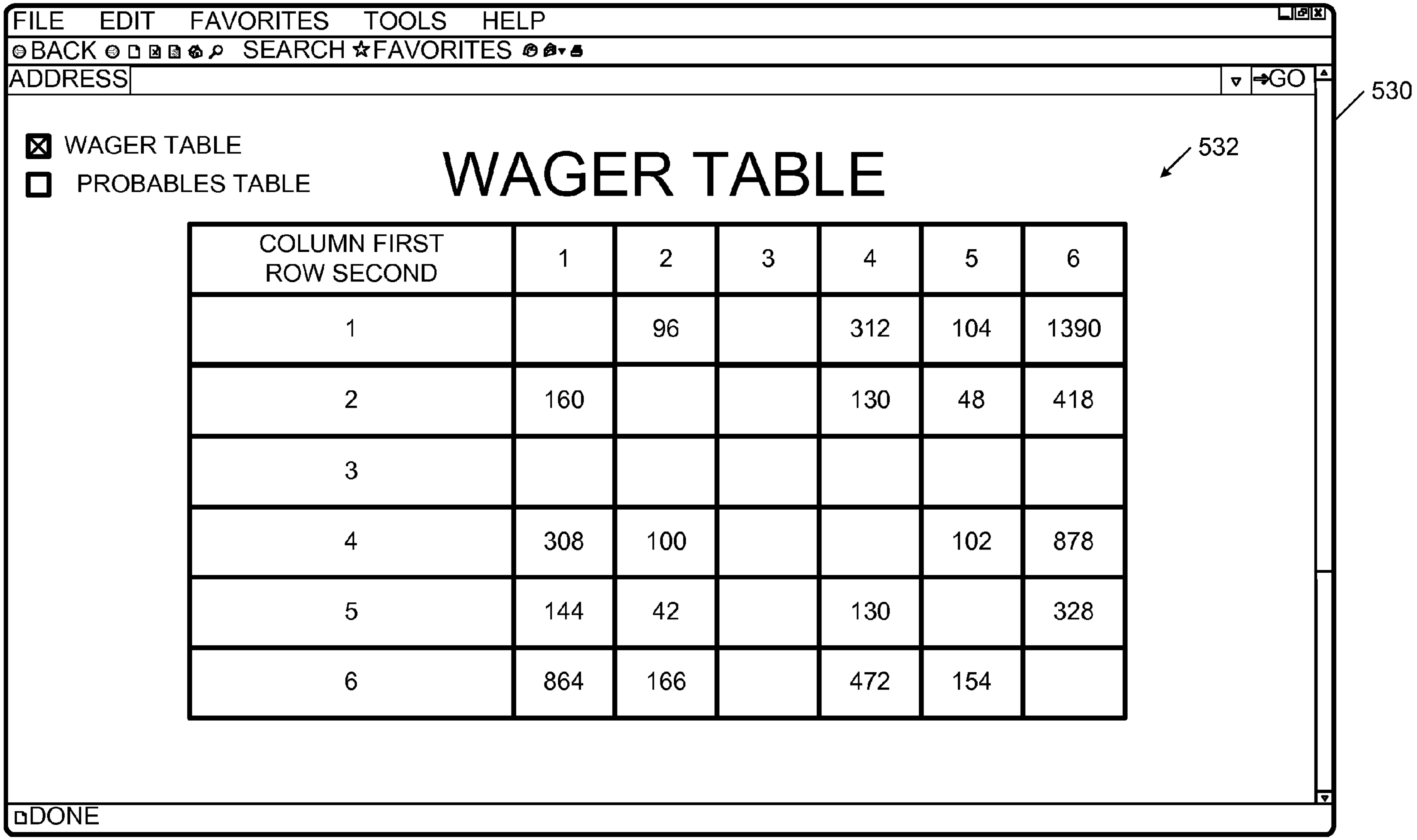
FIG. 5 depicts a user interface of a wagering table for providing wagering amounts for combinations of event participants, according to one or more embodiments shown and described herein.

Additionally, in response to selection of the wager table option 361, the user interface 530 from FIG. 5 may be provided. In response to selection of the probables table option 362 the user interface 630 from FIG. 6 may be provided.

FIG. 5 depicts a user interface 530 of a wagering table for providing wagering amounts for combinations of participants, according to one or more embodiments shown and described herein. As illustrated, the participants of the wagering event are listed on both the column and rows to identify the amount wagered on each of the possible Exacta wagers. Accordingly, the player can determine which is the most popular Exacta wager. In the example of FIG. 5, the most popular wager is a 6-1 Exacta, followed by a 1-6 Exacta.

Figure 6:
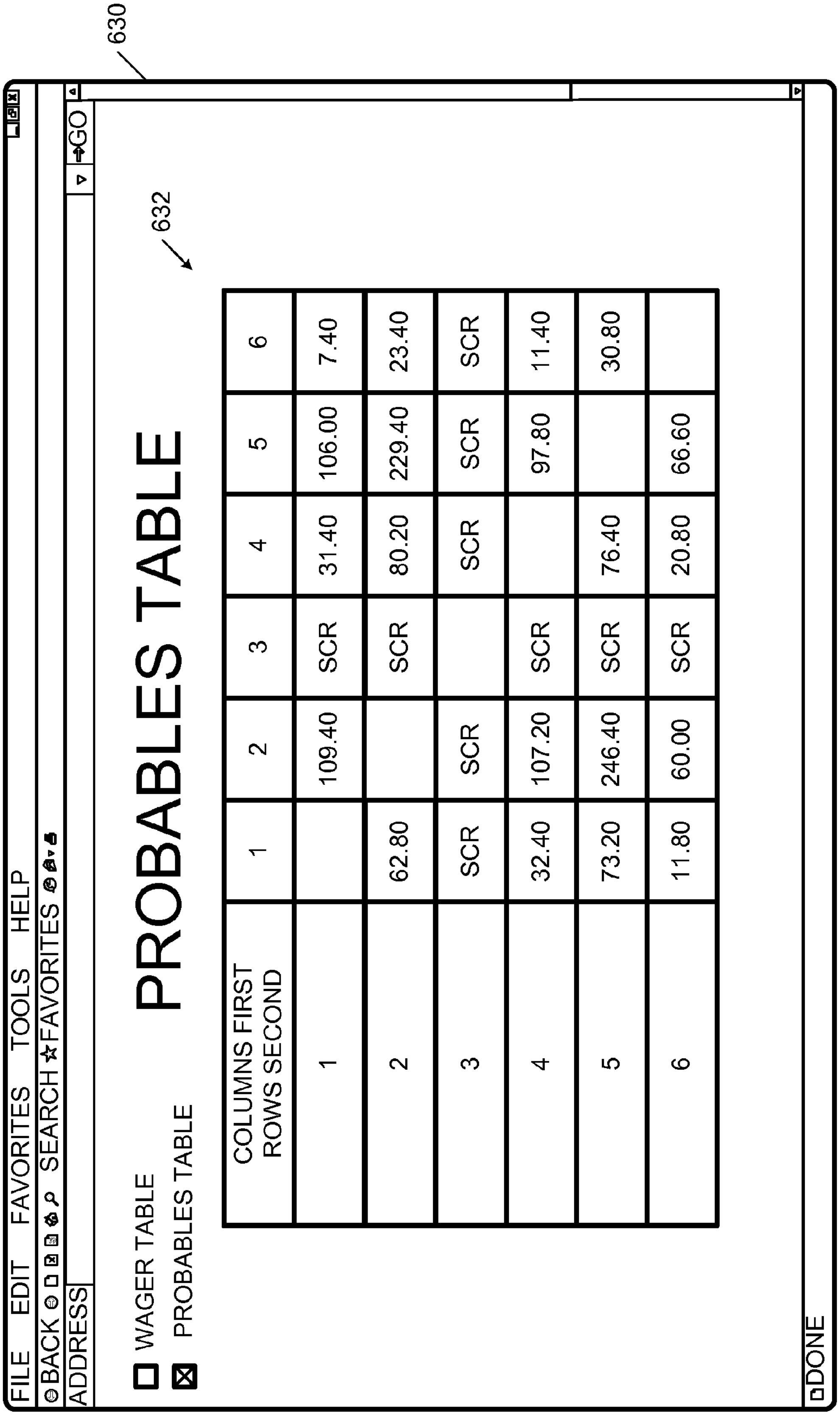
FIG. 6 depicts a user interface of a probables table for providing probables of participants in a particular wagering event, according to one or more embodiments shown and described herein.

FIG. 6 depicts a user interface 630 of a probables table for providing probables of horses in a particular race, according to one or more embodiments shown and described herein. In response to selection of the probables table option 362 from FIGS. 3 and 4, the user interface 530 may be provided. The probables table includes probabilities of the various Exacta wagers winning. As such, the most likely Exacta is the 6-1 Exacta, with the second most likely being the 1-6 Exacta.

Figure 7:
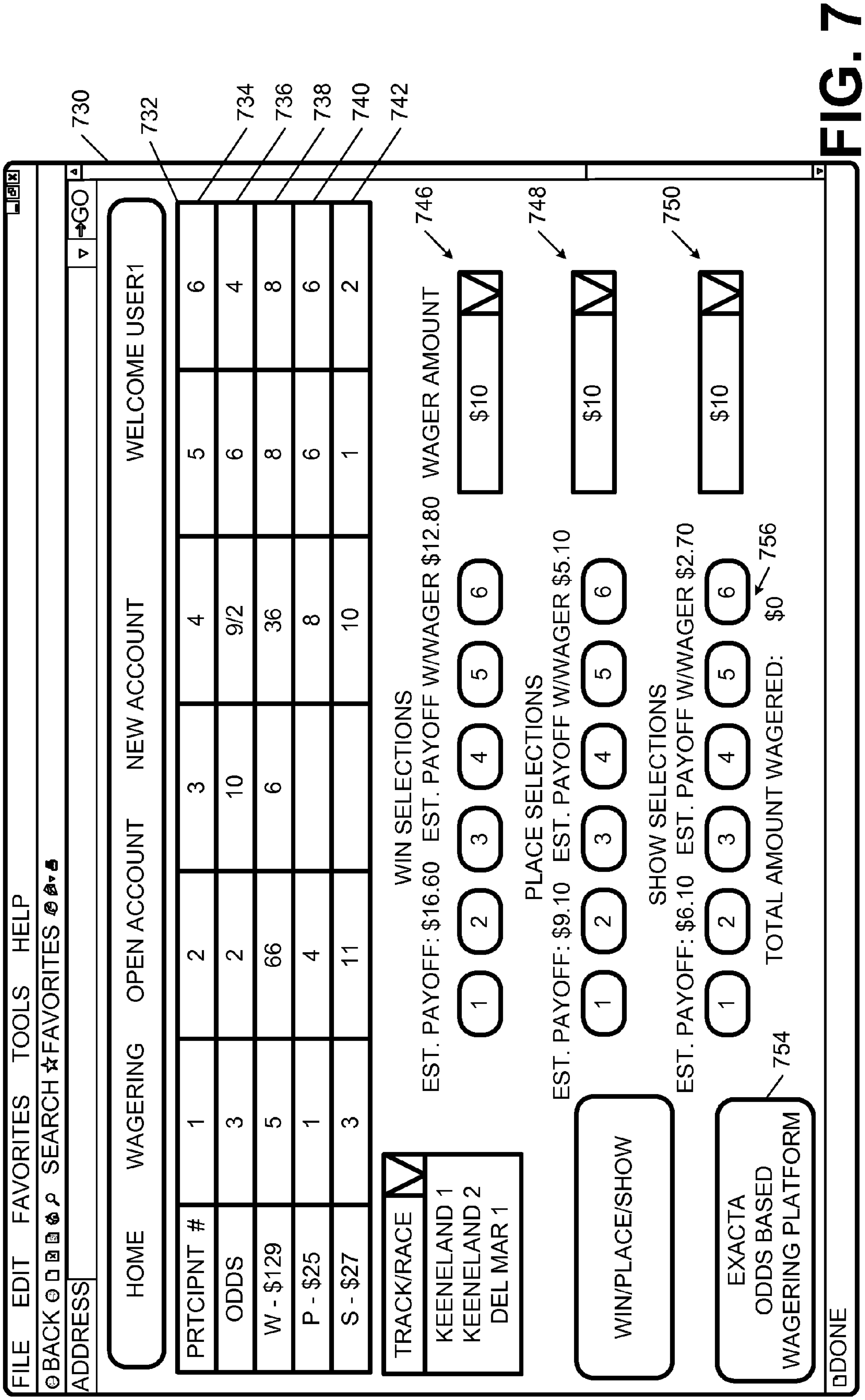
FIG. 7 depicts a user interface for providing single participant wagering using the advanced platform, according to one or more embodiments shown and described herein.

FIG. 7 depicts a user interface 730 for providing single participant wagering using the advanced platform, according to one or more embodiments shown and described herein. In response to selection of the win/place/show option 370 from FIGS. 3 and 4, the user interface 730 may be provided. As illustrated, the user interface 730 includes an odds chart 732, which provides the participant number, the odds, and the amounts that have already been wagered for each type of wager, win, place, and show for each of the participants. Also provided are options for selecting the desired at least one participant for the types of wagers, win, place, and show. The user may additionally provide a wager amount with the wager amount options 746, 748, and 750. A total amount wagered section 756 provides the total amount the player has wagered. The user interface 730 also includes an Exacta option 754 for returning to the user interfaces from FIGS. 3 and 4.

Also included in the user interface 730 payoff calculators. As described above, the odds of many parimutuel wagering events change even after a player places a wager. Accordingly, if the player places a large enough wager, the player may actually affect the odds of the wager, thus reducing the payout. In many current systems, the player has no way of knowing how a wager will affect the odds and/or payout until after placing the wager. However in the user interface 730, the payoff calculators provide the current estimated payoff of the wager selected with the wager amount options 746, 748, 750, as well as a predicted payoff, prior to the wager being placed. The predicted payoff is calculated taking into consideration the effect that the wager will have on the payout. This provides the player with the actual payoff that the player will receive, should the wager win. Similarly, some embodiments may provide a predicted odds value that takes into consideration the effect that the wager will have on the track odds. It will be understood that while the options are provided for win, place, and show wagers, other wagers, such as Exacta, Trifecta, Superfecta, etc. wagers may include similar options.

Figure 8:
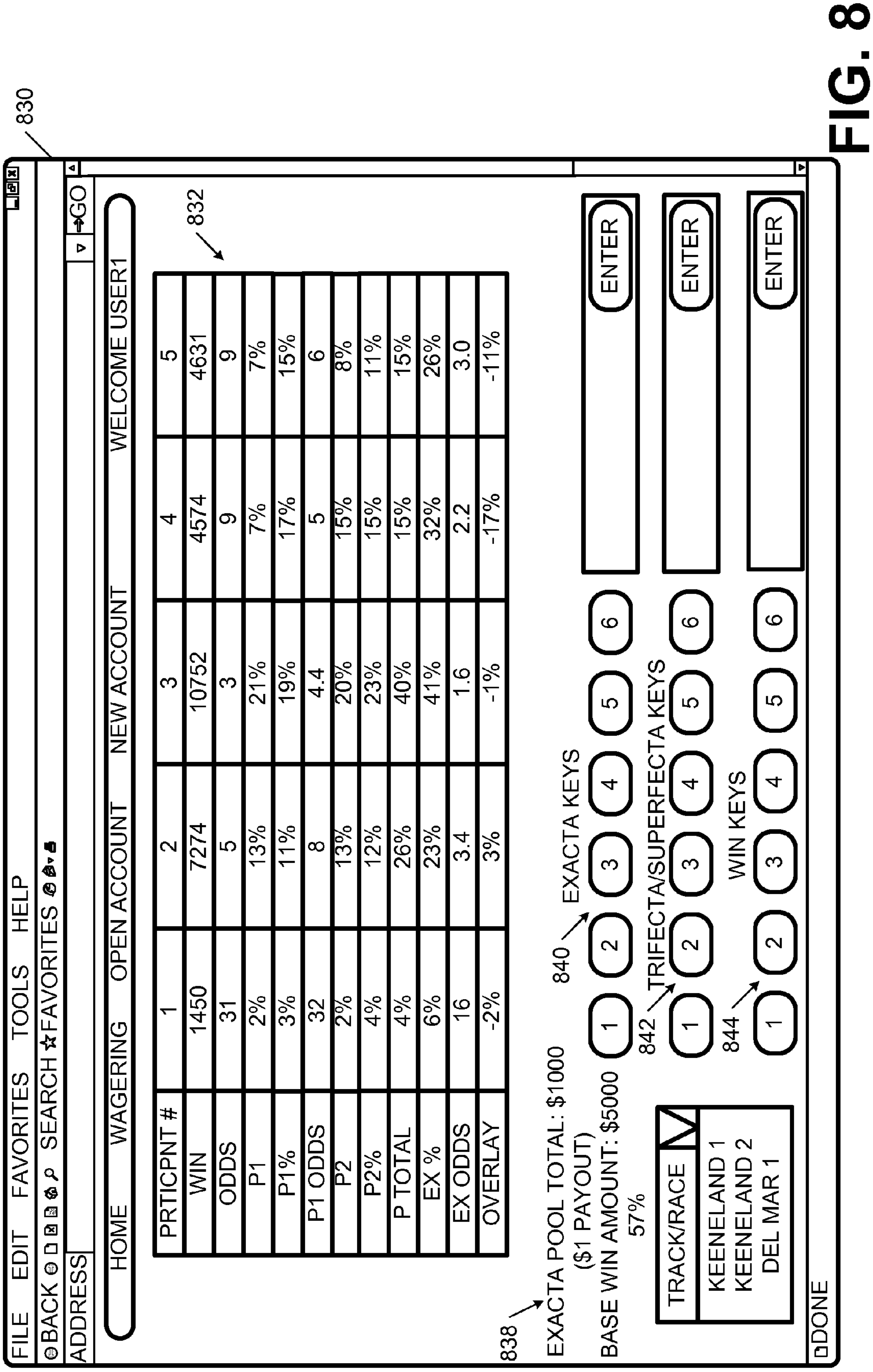
FIG. 8 depicts a user interface for providing Exacta and single participant wagering data, according to embodiments shown and described herein.

FIG. 8 depicts a user interface 830 for providing Exacta and single participant wagering data, according to embodiments shown and described herein. As illustrated, if the user interface 830 is configured to provide the user with information on whether better odds are being provided by the win pool, the Exacta pool, or the Trifecta/Superfecta pool. Specifically, as many wagering events utilize parimutuel wagering, the wagers for a single participant to win are placed in a win pool. The wagers for Exacta wagers are placed in an Exacta pool. The wagers for a Trifecta/Superfecta are placed in the Trifecta/Superfecta pool (in some embodiments these are separate pools, in some they are the same pool). Accordingly, based on the wagers placed in each of the wagering pools, a particular participant may receive a first set of odds in one pool, but a different set of odds for another pool. However, this information is often not provided to the player.

Accordingly, the user interface 830 may provide the player with information regarding which type of wager currently has better (higher) odds for the same participant. As an example, the odds chart 832 includes a win pool total section, which provides the total amount that players have wagered on each of the participants of a wagering event. In the example of FIG. 8, $1450 has been wagered on the 1-horse, which thus carries 31/1 odds. Similarly, the P1 value for the 1-horse is 2, meaning that the 1-horse has an actual probability of winning the event at 2%. The P1% value represents that the cost to wager a wheel with the 1-horse keyed is 3% of the amount wagered. The P1 Odds field represents the odds that the 1-horse is currently receiving in the Exacta pool. In this example, this value is 32/1. The P2 field represents the actual probability of the participant finishing second in the event. The P2% represents the cost of keying the selected participant (e.g., the 1-horse) as the second finisher and wheeling the remaining participants in the event.

Additionally, the P Total field represents a sum of the P1 and P2 fields, described above. The Ex % value represents the sum of P1% (wager percentage) and P2% (Wager percentage) this is the total cost of using the horse in both the $1^{st}$ and $2^{nd}$ positions in the Exacta. The Exacta Odds represents the odds the player would receive if using the designated participant for both the winning position and the second place position in the Exacta. The overlay is calculated by taking the P Total (actual probability based on the real time odds) and the Ex % (the cost of using the horse in both the first and second finishing positions). If the cost is cheaper than the probability then it would be a positive number or an overlay.

Thus, based on whether the odds are better for a desired participant in the win pool or the Exacta pool, the player may easily determine which pool provides the higher payout. As an example, if it is determined that the Exacta pool provides a larger payout for a predetermined participant, the player may enter a key wager, in which the player keys the participant that has the better odds in the Exacta pool and "wheels" each of the other participants in the event (e.g., if the 1-horse is keyed, the player would place four wagers: a 1-2 Exacta, a 1-3 Exacta, a 1-4 Exacta, and a 1-5 Exacta). This effectively allows the player to place the "win" wager on the desired participant, but realize the odds from the Exacta pool. If the odds are better for a desired participant in the win pool, the player may simply place a wager in that pool directly.

Accordingly, the user interface 830 also includes an amounts section 838, an Exacta keys section 840 for selecting an Exacta key wager, a Trifecta/Superfecta keys section 842 for selecting a Trifecta key wager and/or a Superfecta key wager, and a win keys section 844 for selecting a win key wager. The amounts section 838 provides the current Exacta pool amount and the payout, as well as the base win amount (described before) and the associated percentage. The Exacta keys section 840 provides the user with the ability to specify the keyed participant, as described above to realize the odds from the Exacta pool. The Trifecta/Superfecta keys section 842 provides options to place keyed Trifecta and/or Superfecta wagers. The win keys section 844 provides options for the user to place single participant wagers.

It should be understood that as described above, embodiments of FIG. 8 may also be configured to determine an amount to wager for each portion of a wager to provide the base win amount. As an example, if one portion of the wager includes participants with higher odds, the amount wagered would be less. If the odds of the participants are low, the amount wagered would be more.

Figure 9:
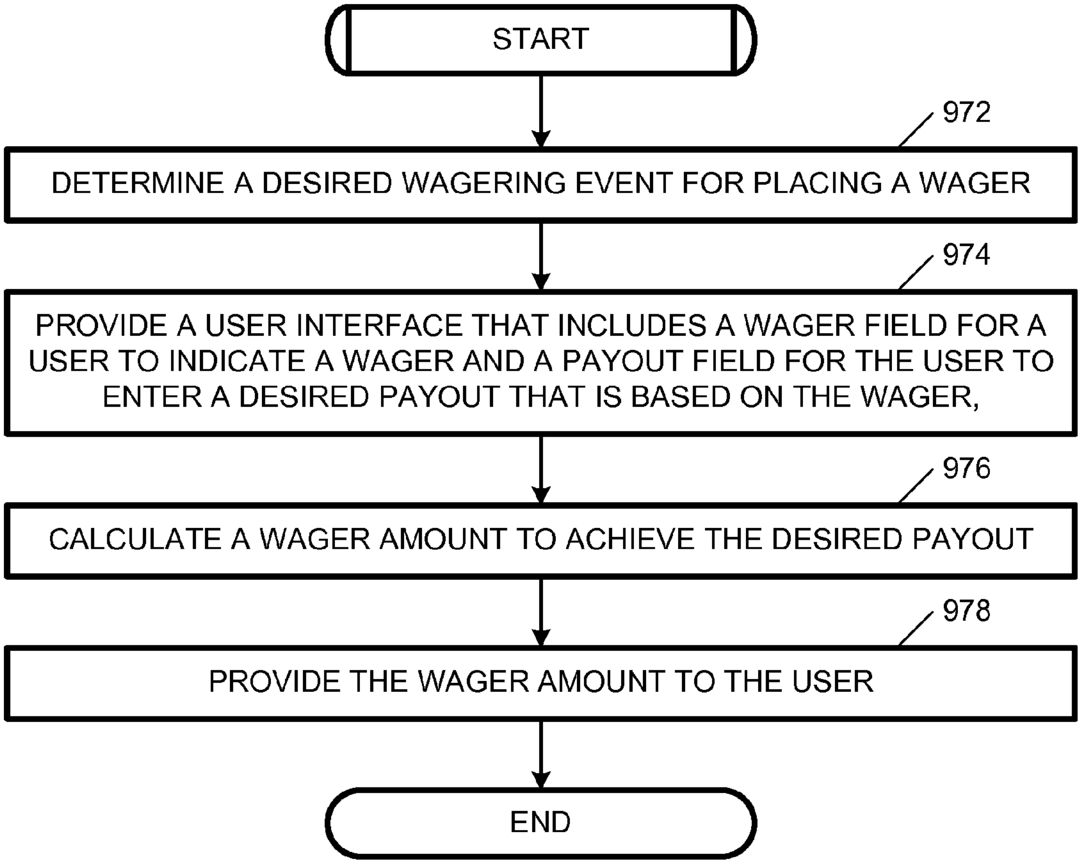
FIG. 9 depicts a flowchart for providing advanced wagering, according to one or more embodiments shown and described herein.

FIG. 9 depicts a flowchart for providing advanced wagering, according to one or more embodiments shown and described herein. As illustrated in block 872, a desired wagering event for placing a wager may be determined. In block 874, a user interface may be provided that includes a wager field for a user to indicate a wager and a payout field for a user to enter a desired payout that is based on the wager. In block 876, a wager amount may be calculated to achieve the desired payout. In block 878, the wager amount may be provided to the user.

Figure 10:
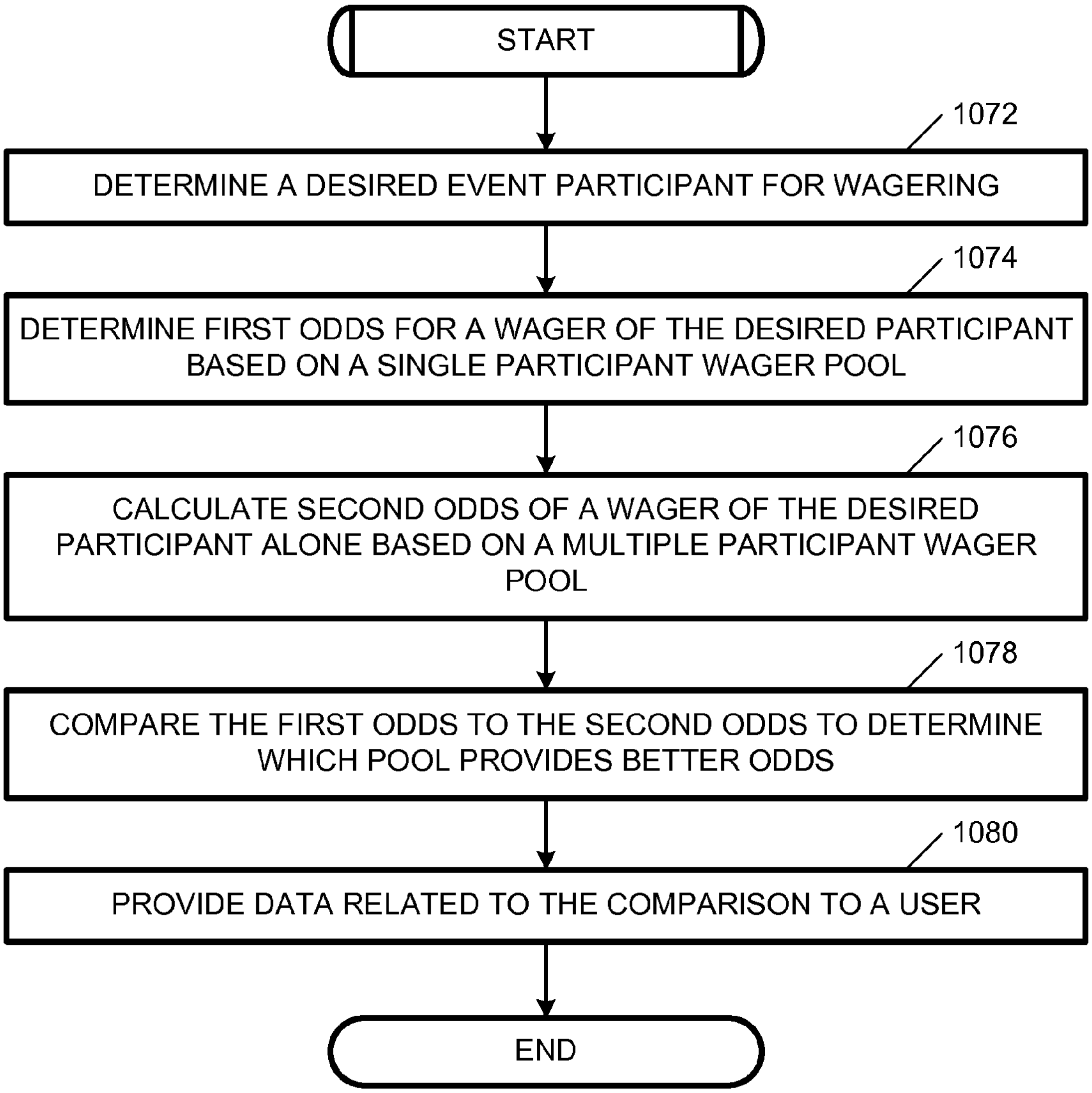
FIG. 10 depicts a flowchart for determining a wager pool with better odds, according to one or more embodiments shown and described herein.

FIG. 10 depicts a flowchart for determining a wager pool with better odds, according to one or more embodiments shown and described herein. As illustrated in block 1072, a desired event participant for wagering may be determined. As disclosed above, any applicable wagering event, such as horse racing where a parimutuel pool is utilized may be considered as part of this disclosure. In the horse racing example, an event participant may be a horse in that particular race. Thus, the desired event participant may be the horse that the player wishes to place a wager. In block 1074, first odds for a wager of the desired participant may be determined, based on a single participant wager pool. As also described above, a race track may have a parimutuel pool for win wagers and one or more different parimutuel pools for Exacta, Trifecta, Superfecta wagers. Accordingly, block 1074 determines odds for the desired event participant in the win pool (or other "single winner pool"). In block 1076, second odds of a wager of the desired participant alone in a multiple participant wager pool may be calculated. Specifically, the odds of the desired event participant may be determined in the Exacta pool, the Trifecta pool, and/or the Superfecta pool. In block 1078, the first odds may be compared to the second odds to determine which pool provides the better odds for the desired event participant. In block 1080, data related to the comparison may be provided to a user.

Figure 11:
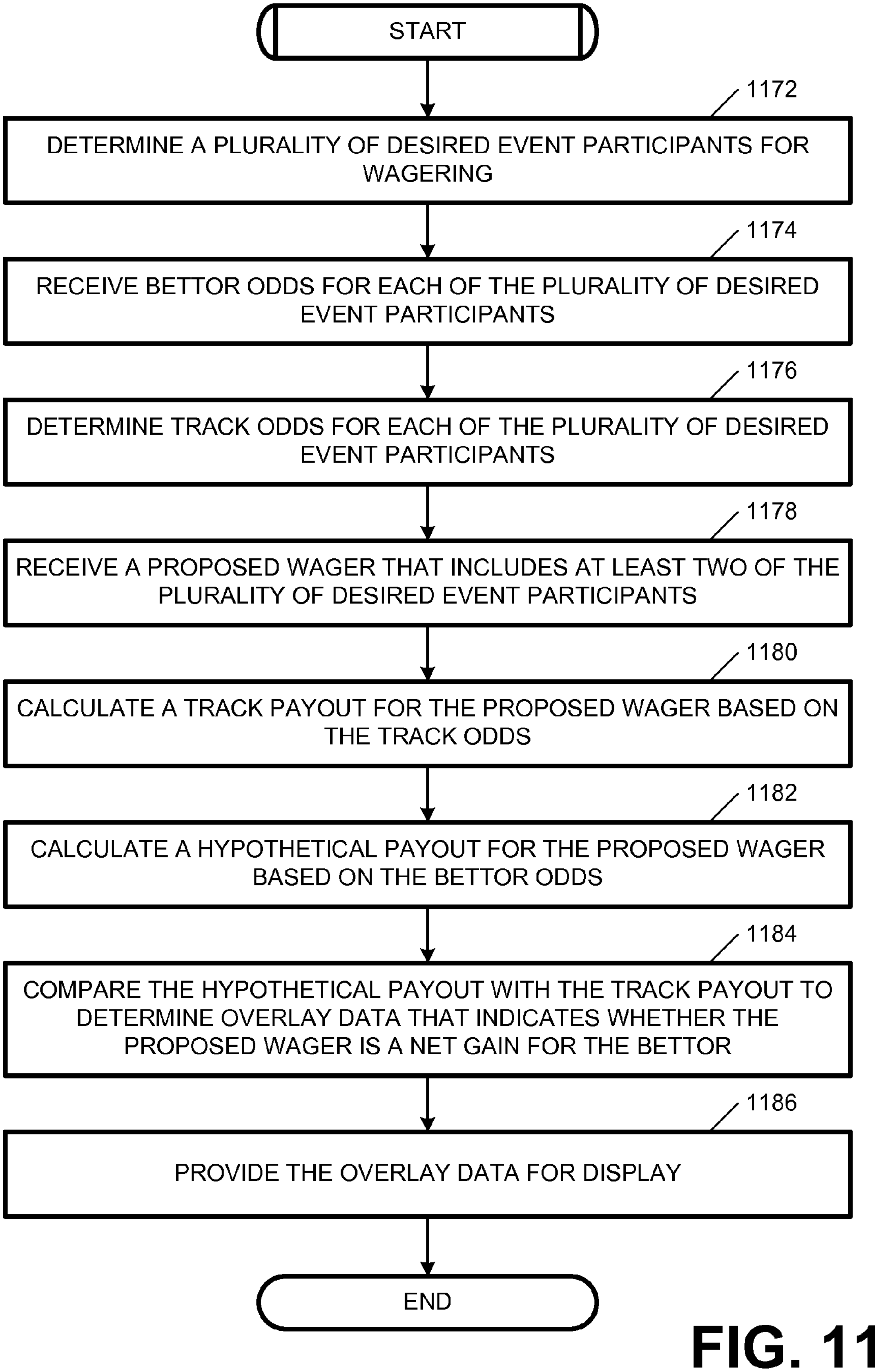
FIG. 11 depicts a flowchart for providing an overlay of player odds and track odds, according to one or more embodiments shown and described herein.

FIG. 11 depicts a flowchart for providing an overlay of player odds and track odds, according to one or more embodiments shown and described herein. As illustrated in block 1172, a plurality of desired event participants may be determined for wagering. In block 1174, player odds for each of the plurality of desired event participants may be received. In block 1176, track odds for each of the plurality of desired event participants may be determined. In block 1178, a proposed wager that includes at least two of the plurality of desired event participants may be received. In block 1180, a track payout for the proposed wager may be calculated based on the track odds. In block 1182, a hypothetical payout for the proposed wager may be calculated based on the player odds. In block 1184, the hypothetical payout may be compared with the track payout to determine overlay data that indicates whether the proposed wager is a net gain for the player. As an example, if the player assess that the track odds for particular participants in a race are higher than the player odds, the wager will become a net gain for the player because the track payout will be higher the player's calculation of the likelihood of the selected participants finish as wagered. In block 1186, the overlay data may be provided for display.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for advanced wagering, comprising:

a memory component that stores logic that, when executed by a processor, causes the system to perform at least the following:

determine a wagering event occurring at a track for a player to place a wager;

provide a user interface that includes a wager field for a user to indicate the wager and a payout field for the user to enter a desired payout that is based on the wager;

receive track odds for the wagering event, wherein the track odds are calculated by the track;

receive, from a user computing device, player odds for the wagering event, wherein the player odds are calculated by the player before the wagering event and reflect a likelihood that the player believes a result in the wagering event will occur;

determine a total overlay percentage that represents a difference between the track odds and the player odds for the wagering event;

calculate a wager amount to achieve the desired payout;

provide the wager amount to the user; and place the wager for the wager amount via an electronic transaction with the user computing device.

2. The system of claim 1, wherein the logic further causes the system to provide an option to wager on the wagering event.

3. The system of claim 1, wherein calculating the wager amount comprises calculating an amount to wager on each portion of the wager to achieve the desired payout.

4. The system of claim 1, wherein the logic further causes the system to provide an option for receiving the player odds, the player odds being determined by a player.

5. The system of claim 1, wherein the logic further causes the system to provide an individual overlay percentage that represents a difference between the track odds and the player odds of an event participant of the wagering event.

6. The system of claim 1, wherein the logic further causes the system to provide a predicted payout of the wager prior to the wager being placed, wherein calculating the predicted payout takes into consideration a predicted effect that the wager will have on track odds of the wagering event.

7. The system of claim 1, further comprising, recommending a recommended wager, based on the overlay percentage.

8. A method for advanced wagering, comprising:

determining, by a remote computing device, a plurality of desired event participants for wagering;

receiving, by the remote computing device, player odds for a wagering event from a player via a user computing device for each of the plurality of desired event participants, wherein the player odds are calculated by the player before the wagering event and reflect a likelihood that the player believes a result in the wagering event will occur;

receiving, by the remote computing device, track odds for each of the plurality of desired event participants;

receiving, by the remote computing device, a proposed wager from the user computing device that includes at least two of the plurality of desired event participants;

calculating, by the remote computing device, a track payout for the proposed wager based on the track odds;

calculating, by the computing device, a hypothetical payout for the proposed wager, based on the player odds;

comparing, by the remote computing device, the hypothetical payout with the track payout to determine overlay data that indicates whether the proposed wager is a net gain for the player;

providing, by the remote computing device, the overlay data for display; and placing, by the remote computing device, the proposed wager via an electronic transaction with the user computing device.

9. The method of claim 8, further comprising providing a user interface for a user to provide the player odds and provide the overlay data for display.

10. The method of claim 8, wherein the proposed wager comprises at least one of the following: an Exacta wager, a Trifecta wager, and a Superfecta wager.

11. The method of claim 8, further comprising calculating a wager amount of each portion of the proposed wager to achieve a predetermined base win amount.

12. The method of claim 8, further comprising determining overlay data for at least one of the plurality of desired event participants.

13. The method of claim 8, further comprising providing an option to place a wager.

14. The method of claim 8, further comprising providing a user option for indicating a desired win amount and, in response to receiving the desired win amount, calculating a wager amount related to the desired win amount.

15. The method of claim 8, further comprising providing wager percent data that represents a cost of placing a wager.

16. A non-transitory computer-readable medium that stores logic that, when executed by a computing device, causes the computing device to perform at least the following:

determine a desired event participant of an event for wagering;

determine first odds for a proposed wager of the desired event participant, based on a single participant wager pool;

calculate second odds of the proposed wager of the desired event participant alone, based on a multiple participant wager pool;

compare the first odds to the second odds to determine which pool provides better odds for a player; and recommend, to the user on a user computing device, an actual wager, based on the better odds; and place the actual wager via an electronic transaction with the user computing device.

17. The non-transitory computer-readable medium of claim 16, wherein the logic further causes the computing device to provide an option to key a desired first participant with all other desired event participants in the event in a key wager.

18. The non-transitory computer-readable medium of claim 17, wherein the key wager comprises at least one of the following: an Exacta key wager, a Trifecta key wager, a Superfecta key wager, and a win key wager.

19. The non-transitory computer-readable medium of claim 17, wherein the logic further causes the computing device to calculate a wager amount of each portion of the key wager to achieve a predetermined base win amount.

20. The non-transitory computer-readable medium of claim 16, wherein the logic further causes the computing device to a percentage of wagers that have been made for the desired event participant in the multiple participant wager pool.

* * * * *